(12) United States Patent
Rapp et al.

(10) Patent No.: US 8,949,673 B2
(45) Date of Patent: Feb. 3, 2015

(54) SOFTWARE SYSTEMS TESTING INTERFACE

(75) Inventors: Roman Rapp, Villeneuve Loubet (FR); Jean Francois Gaillard, La Colle sur Loup (FR); Christophe Aubert, Valbonne (FR); Jean-Philippe Meola, Cagnes sur Mer (FR); Kushakovska Olena, Cannes (FR)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 13/479,007

(22) Filed: May 23, 2012

(65) Prior Publication Data
US 2013/0318402 A1 Nov. 28, 2013

(51) Int. Cl.
*G06F 11/00* (2006.01)

(52) U.S. Cl.
USPC .............................. 714/38.1; 714/46

(58) Field of Classification Search
CPC ............ G06F 11/3664; G06F 11/3684; G06F 11/3688
USPC .................................. 714/38.1, 46
See application file for complete search history.

(56) References Cited

U.S. PATENT DOCUMENTS

| | | | | |
|---|---|---|---|---|
| 6,473,707 | B1 * | 10/2002 | Grey | 702/123 |
| 7,480,900 | B1 * | 1/2009 | Zhou et al. | 717/132 |
| 2003/0140138 | A1 * | 7/2003 | Dygon et al. | 709/224 |
| 2004/0107415 | A1 | 6/2004 | Melamed et al. | |
| 2006/0259629 | A1 * | 11/2006 | Usmani et al. | 709/227 |
| 2006/0271322 | A1 * | 11/2006 | Haggerty | 702/108 |
| 2007/0136024 | A1 * | 6/2007 | Moser et al. | 702/119 |
| 2007/0277154 | A1 | 11/2007 | Badwe et al. | |
| 2008/0244524 | A1 * | 10/2008 | Kelso | 717/124 |
| 2013/0042222 | A1 * | 2/2013 | Maddela | 717/124 |
| 2013/0054792 | A1 * | 2/2013 | Sharaf | 709/224 |
| 2013/0198568 | A1 * | 8/2013 | Ahmed et al. | 714/32 |

OTHER PUBLICATIONS

"European Application Serial No. 13001600.9, Extended European Search Report mailed Dec. 2, 2013", 7 pgs.

* cited by examiner

*Primary Examiner* — Joshua Lohn
(74) *Attorney, Agent, or Firm* — Schwegman Lundberg & Woessner, P.A.

(57) ABSTRACT

A system includes a manager module that oversees execution of a business process by a test module. The business process includes a plurality of process steps, and the test module comprises a plurality of test cases, a plurality of software test tools, and a plurality of parameters. The test module is configured to permit a user to select a particular process step of the business process, to select a particular test case for the particular process step, to select a particular software test tool for the particular test case, and to select a particular parameter flow for the particular software test tool. The test module is also configured to execute the selected process step using the selected test case, the selected software test tool, and the selected parameter flow.

23 Claims, 6 Drawing Sheets

Fig. 3

SOFTWARE SYSTEMS TESTING INTERFACE

TECHNICAL FIELD

The present disclosure relates to systems and methods for testing software systems.

BACKGROUND

In many software systems, there are different ways to create and execute system and software tests in general, and automated tests in particular. There can be different and specific tests for different functions, programs, processes, or scenarios in a system. For example, there can be common, pre-delivered tests for commonly executed transactions. There can also be tests for graphical user interfaces, and tests for application program interfaces. These different testing scenarios can use internal and external scripts.

BRIEF DESCRIPTION OF THE DRAWINGS

FIG. 3 is an example embodiment of a user interface illustrating software test tools and parameters for the software test tools.

DETAILED DESCRIPTION

Figure 1:
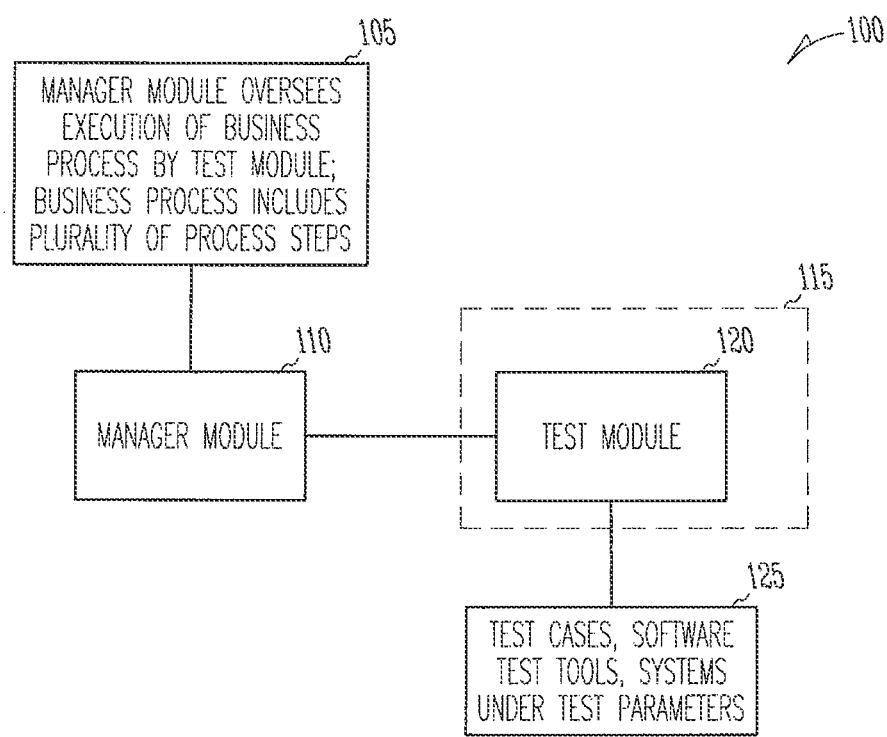
FIG. 1 is a block diagram illustrating a manager module and a test module.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 5:
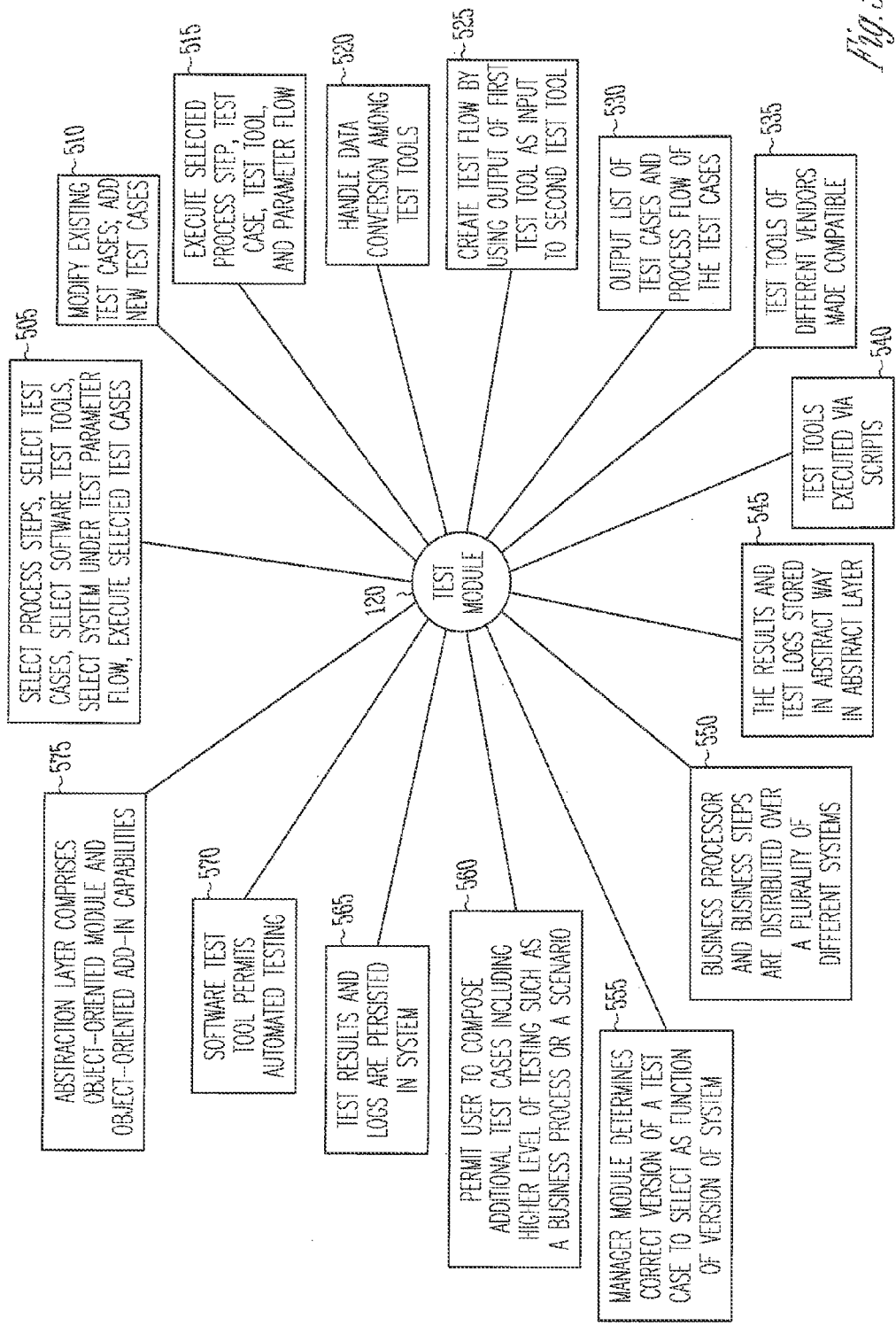
FIG. 5 is a block diagram illustrating a plurality of features of a software test system.

Several embodiments will now be described in connection with the figures. FIG. 1 illustrates an example embodiment of a system 100 including a manager module 110 and a test module 120. In a particular embodiment, the test module 120 is part of an abstraction layer 115 that is separate and distinct from the manger module 110. The abstraction layer 115 can be implemented using object-oriented modules. The abstraction layer 115 can further include object-oriented add-in capabilities. (FIG. 5, No. 575) As indicated at 105, the manager module 110 oversees the execution of a business process by the test module 120, and the business process includes process steps. The test module 120 includes a plurality of test cases, test tools, systems under test, and parameters (125). In an embodiment, the test module 120 generates a series of user interfaces that permit a user to select test cases for the process steps of the business process, to select software test tools for those test cases, to select a system under test, to select parameters and a parameter flow for those software test tools, and to execute the selected test cases using the selected software test tools and selected parameters and flow for the selected parameters (FIG. 5, No. 505). A user can determine the execution of a particular test tool via the selection and arrangement of the parameters for that test tool. A user can also create a software test process flow by selecting a series of several test cases. Several software test tools can be selected and executed within the test module 120, and the abstraction layer 115 creates common wrapper for the manager module 110 so that the manager module can handle different test modules in the same manner or a similar manner. The software test process flow can include steps, decision points, branches, and other program-like constructs. The test module 120 further permits a user to edit and modify existing test cases, and/or to add new test cases to the system. (FIG. 5, No. 510)

Figure 6:
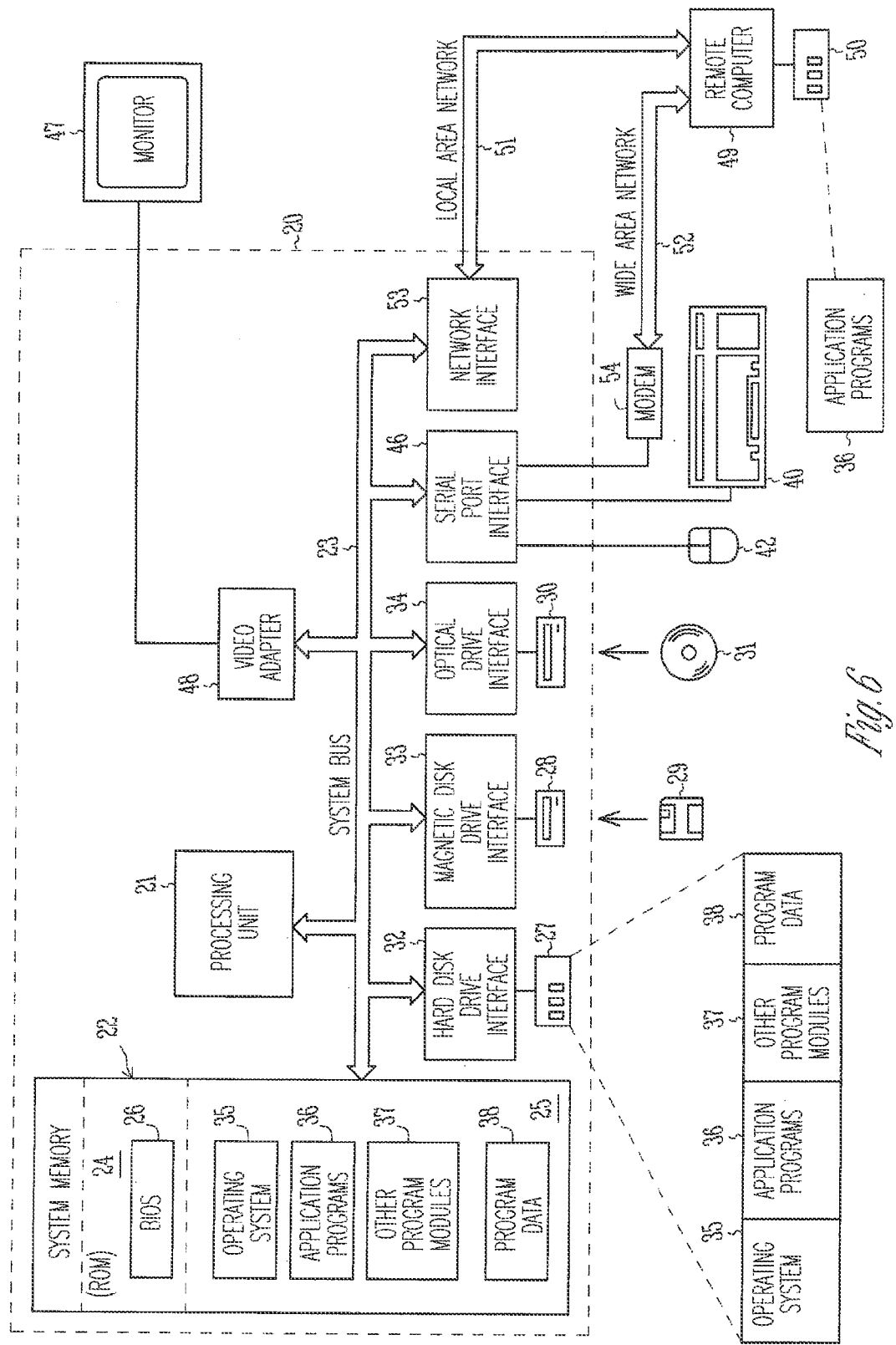
FIG. 6 is a block diagram of a computer processor system upon which an embodiment of the current disclosure can execute.

In an embodiment, the manager module 110 and test module 120 are executed on at least one computer processor. A computer processor system upon which one or more embodiments of the manager module 110 and test module 120 can execute is illustrated in FIG. 6 and will be discussed in detail below. The test module 120 can include many test cases, many software test tools, and many parameters that can be used with the software test tools. A test case indicates details of a test (e.g., identity of a test tool and associated script, test parameters, test systems, test users, etc.) that is to be used to test a certain process step. There can be several test cases associated with a particular process step, and a user can develop a test plan using one or more of the several test cases in testing the particular process step. The test case can further identify certain software test tools that can be used to implement the test script and parameters to be used with the software test tools. Each software test tool in general automatically executes its particular testing scenario. (FIG. 5, No. 570) Several test cases can be bundled into a test plan to test several business process steps, several business processes, and several business scenarios, and in the end, the whole business solution in a customer environment.

Figure 2:
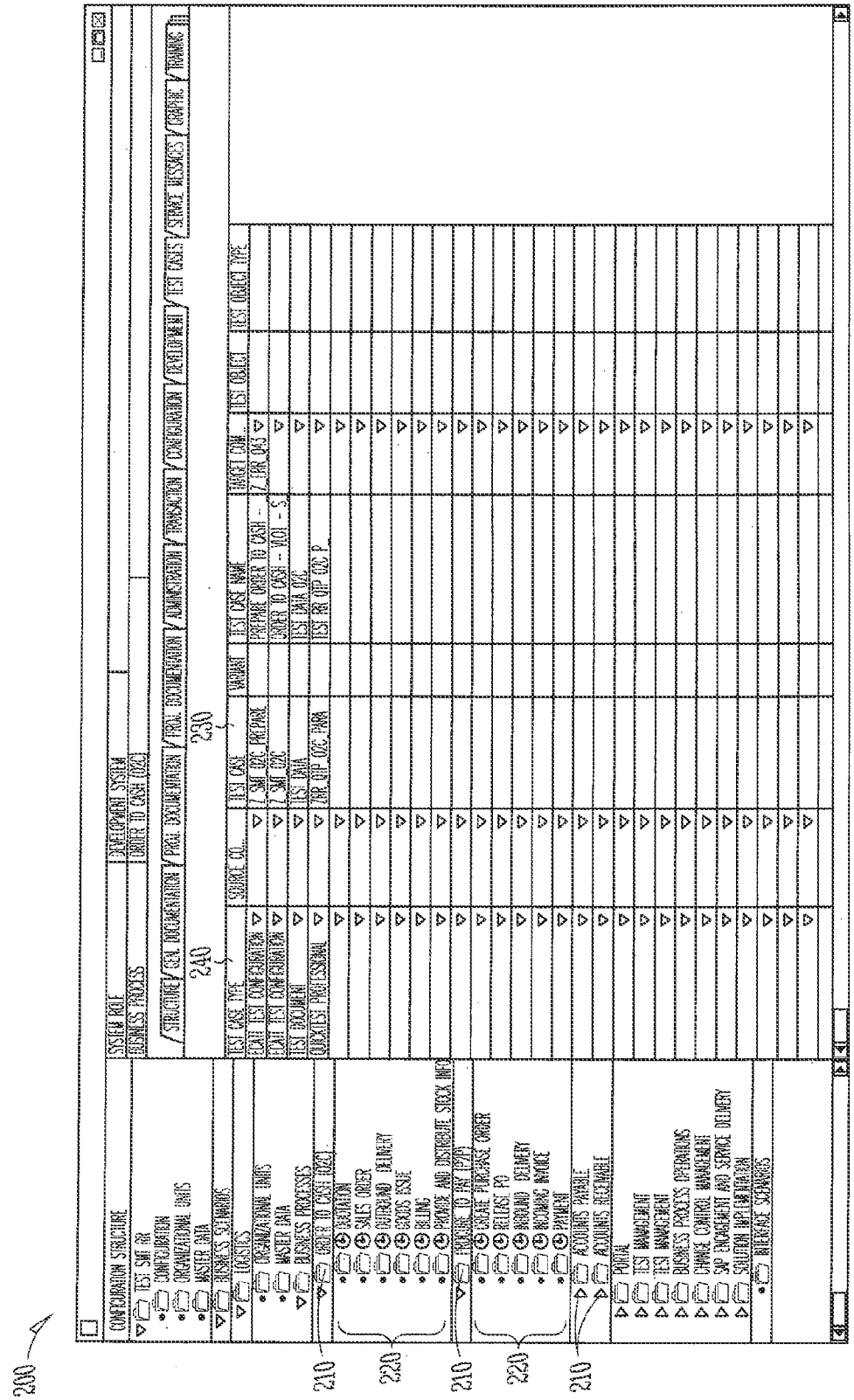
FIG. 2 is an example embodiment of a user interface illustrating a business process, process steps of the business process, and test cases associated with a particular step of the business process.

In an embodiment, the test module 120 associates each process step of a business process with at least one test case. FIG. 2 illustrates an example user interface 200. The user interface 200 displays business processes 210 to a user. The user interface 200 also displays to a user the process steps 220 that are associated with a particular business process 210. FIG. 2 further illustrates that when a user selects a particular process step 220, the user interface 200 displays to the user the test cases 230 that are associated with that particular process step 220. FIG. 2 also illustrates the software test tools 240 that are associated with a particular test case. The user interface 200 can also include manual test cases that do not require a test tool, but consist of just a description (i.e., a test document) of how a user can test a process step.

Figure 3:
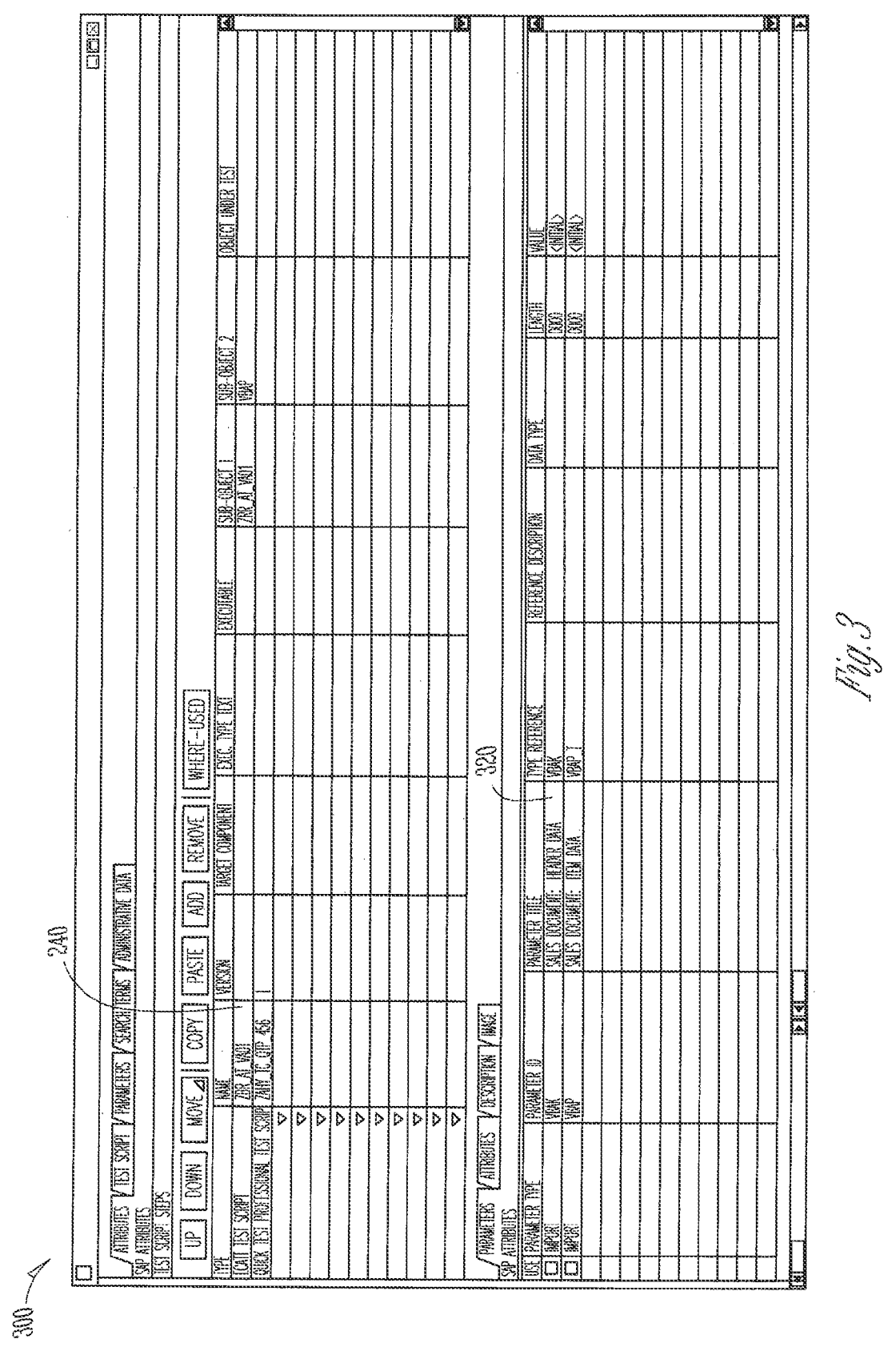

When a user selects a particular test case 230 in FIG. 2, the user can navigate to interface 300 of FIG. 3. The user interface 300 illustrates, as does the interface 200 of FIG. 2, the software tools 240 that are associated with the selected test case, and the user interface 300 further illustrates the parameters 320 that are associated with a particular test script. Unlike the user interface 200 of FIG. 2 that may include manual tests, the user interface 300 of FIG. 3 relates only to automated tests that use a test tool and a test script to execute a test automatically. The parameters 320 include the data that is required as input to the test script, and the output generated by the test script. Different test tools can have different formats (e.g., different date formats, limited character or string formats, etc.) of test parameters. The abstraction layer 115 ensures that the conversion to different formats will happen internally and that all parameters can be displayed in the same way to an end user. Different parameters can be selected depending upon the situation of a particular test. Consequently, the test module 120 permits a user to select a business process, to select a process step of the business process, to select a test case for the process step, and to select input parameters for a test case and to define a parameter flow between different test cases (e.g., using output parameters of a previous test case as input parameters for following test cases). In an embodiment, the parameter flow in the abstraction layer is independent of the test tool. This enables the handover of parameters between test cases belonging to different tools. The conversion of the parameters to the specific test tool is handled on a lower level such as by tool specific plug-ins. In another embodiment, the test module is configured to permit a user to first select the particular software test tool and then to provide an identifier to the particular test case. The test module is then further configured to prevent a changing of the particular software test tool for the particular test case.

Figure 4:
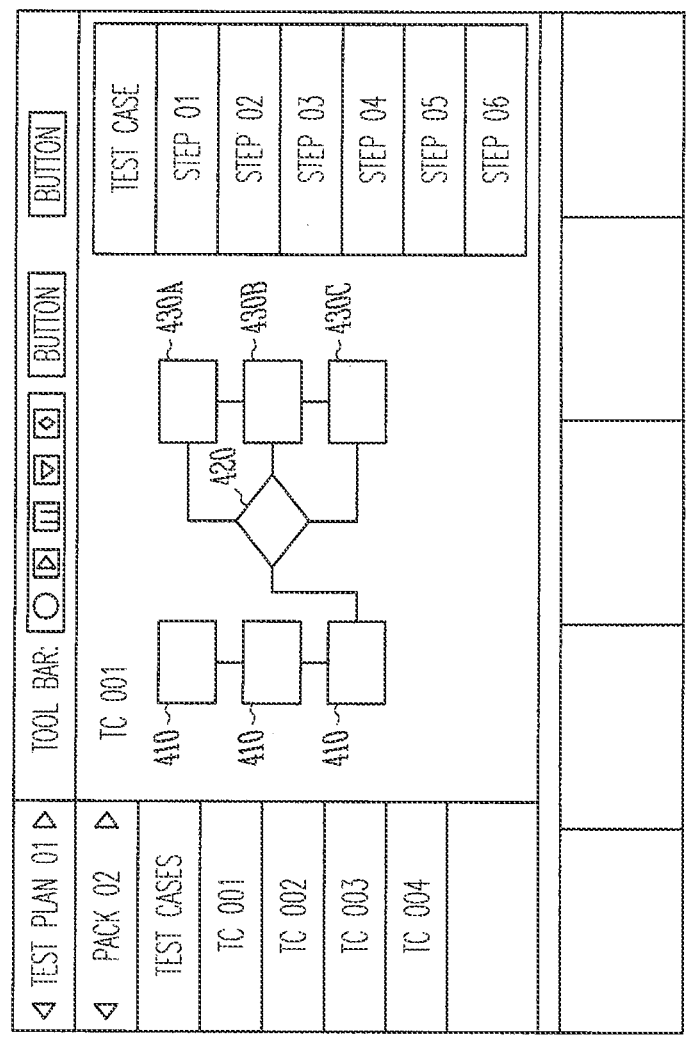
FIG. 4 is an example embodiment of a user interface illustrating a process flow of a software test.

A user can now create a new test case on a business process level, by defining a test flow, which includes several test cases on a business process step level, using different software tools. These business process test cases can be coupled together with another test case on a higher level to automate the testing of business scenarios in one test case. After a user creates such a test flow by selecting a process step, a test case, a software test tool, and defining a parameter flow, the test module 120 executes the selected process step using the selected test case, the selected software test tool, and the selected parameters and parameter flow. (FIG. 5, No. 515) The test module 120 can further be configured to handle data conversion during execution of the selected process step such that data in a format that is compatible with a first software test tool is converted into a format that is compatible with a second software test tool. (FIG. 5, No. 520) In this manner, an output parameter for the first software test tool serves as input to the second software test tool, thereby creating a test flow between the first software test tool and the second software test tool. (FIG. 5, No. 525) When multiple test cases are put together for multiple process steps, a test flow is created. The test module 120 can output a graphical display of the test flow including a simple list of the test cases and a process flow of the test cases. (FIG. 5, No. 530) As illustrated in FIG. 4, the graphical display 400 can include process blocks 410, each process block illustrating a particular test case, and the software test tools and parameters used in the particular test case. The process flow can illustrate decision points 420, such that based upon the results of a test case, the test flow can branch to one of several different test cases 430A, 430B, 430C to be executed as the next test case in the test flow.

There are several advantages to one or more embodiments. For example, as noted, the test module 120 handles data conversion among software test tools. Consequently, in situations where many process steps are tested using several test cases and several software test tools, and several of these test tools originate from different vendors, there could be a compatibility problem using the output of one software test tool as input to another software test tool. The test module 120 however is configured with the information regarding the output of the software test tools, and converts the output of any particular software test tool so that it can serve as the input to any another software test tool, thereby making the software test tools of the different vendors compatible. (FIG. 5, No. 535) Additionally, a test tool receives a script from the test module and executes the script. (FIG. 5, No. 540) The test script resides in central storage in the abstraction layer 115. The execution of the test script results in parameters that are exported from the test script and maintained in the abstract layer for compatibility handling. More specifically, a test tool's execution generates test results and test logs, which may be in different formats than the formats generated by other software test tools, that are stored in an abstract way (i.e., a common format) in the abstraction layer. (FIG. 5, No. 545) These test results and test logs can be persisted in the system, thereby enabling a comparison of the results and logs of the many different software test tools. In an embodiment, there is a plurality of native logs from each of the specific software test tools. In the vast majority if not all circumstances, the native logs are not compatible and cannot be compared. The test module however generates a simplified log, which can be compared. FIG. 5, No 565) As noted, the compatibility of the parameters from different software test tools is addressed such that different software test tools can be treated in the same manner or a similar manner.

In an embodiment, one or more of the business processes and the process steps are distributed over a plurality of different systems. (FIG. 5, No 550) In such cases, the manager module can be configured to determine a correct version of a test case to select as a function of a version of the system. (FIG. 5, No. 555) As previously noted, in another embodiment, the test module permits a modification of existing test cases and a creation of new test cases. (FIG. 5, No. 510)

An embodiment permits a user to compose a plurality of additional test cases. The additional test cases are configured to use additional software tools, which adds at least one new test case. The new test case can include a higher level of testing including a testing of a business process or a testing ala scenario (as compared to the testing of process steps as disclosed above). (FIG. 5, No. 560) A scenario can include the testing of several different business processes in a particular system that is constructed of those business processes.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are, linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   at least one computer processor configured to:
      execute a manager module that oversees execution of a business process by a test module, the business process comprising a plurality of process steps;
      wherein the test module comprises a plurality of test cases, a plurality of software test tools, a plurality of systems under test, and a plurality of parameters;

wherein the test module is configured to permit a user to select a particular process step of the business process, to select a particular test case for the particular process step, to select a particular software test tool for the particular test case, to select a particular system under test, and to select a particular parameter flow for the particular software test tool;

wherein the test module is configured to execute the selected process step using the selected test case, the selected, software test tool, the selected system under test, and the selected parameter flow;

wherein the test module is configured to handle data conversion during execution of the selected process steps such that data in a format that is compatible with a first software test tool is converted into a format that is compatible with a second software test tool;

wherein the test module is configured to store in a computer storage device a plurality of test scripts that are associated with the plurality of software test tools and to execute the plurality of software test tools using the plurality of test scripts;

wherein the test module is configured to process a result and a log of the selected process step such that results and logs of the plurality of software test tools are persisted in the system, thereby enabling a comparison among the results and logs of the plurality of software test tools; and wherein the computer processor configuration to handle data conversion from a format that is compatible with a first software test tool to a format that is compatible with a second software test tool further comprises a configuration such that an output parameter for the first software test tool serves as input to the second software test tool, thereby creating a test flow between the first software test tool and the second software test tool.

2. The system of claim 1, wherein at least one of the plurality of software test tools permits automated testing.

3. The system of claim 1, wherein the test module comprises an abstraction layer that is separate and distinct from the manger module.

4. The system of claim 3, wherein the abstraction layer comprises object-oriented modules.

5. The system of claim 4, wherein the abstraction layer comprises object-oriented add-in capabilities.

6. The system of claim 1, wherein at least one of the plurality of software test tools originates from a party that is different than a party from which other software test tools originate.

7. The system of claim 1, comprising a user interface, the user interface comprising the business process, the plurality of process steps, the plurality of test cases, the plurality of software test tools, the plurality of systems under test, and the plurality of parameters; wherein the user interface is configured to permit the selection of the particular process step, the selection of the particular test case for the particular process step, the selection of the particular software test tool for the particular test case, and the selection of the particular parameter flow for the particular software test tool.

8. The system of claim 1, wherein the process steps are distributed over a plurality of systems.

9. The system of claim 8, wherein the manager module is configured to determine a correct version of a test case to select as a function of a version of the system under test.

10. The system of claim 1, wherein the computer processor configuration that permits the user to select a particular process step of the business process, to select a particular test case for the particular process step, to select a particular software test tool for the particular test case, and to select a particular parameter flow for the particular software test tool, is further configured to display on a user interface at least one of a list of the selected test cases and a flow chart of the selected test cases including a process flow of the test cases.

11. The system of claim 1, comprising a computer processor configured to permit a modification of existing test cases and a creation of new test cases.

12. The system of claim 1, wherein the test module is configured to permit the user to compose a plurality of additional test cases, the additional test cases configured to use additional software tools, thereby adding at least one new test case.

13. The system of claim 12, wherein the new test case comprises a higher level of testing including a testing of a business process or a testing of a scenario.

14. The system of claim 1, wherein the test module is configured to permit the user to select the particular software test tool and to provide an identifier to the particular test case; and wherein the test module is further configured to prevent a changing of the particular software test tool for the particular test case.

15. A system comprising;
at least one computer processor configured to:
execute a manager module that oversees execution of a business process by a test module, the business process comprising a plurality of process steps;
wherein the test module comprises a plurality of test cases, a plurality of software test tools, a plurality of systems under test, and a plurality of parameters;
wherein the test module is configured to permit a user to select a particular process step of the business process, to select a particular test case for the particular process step, to select a particular software test tool for the particular test case, to select a particular system under test, and to select a particular parameter flow for the particular software test tool;
wherein the test module is configured to execute the selected process step using the selected test case, the selected software test tool, and the selected parameter flow;
wherein the test module is configured to handle data conversion during execution of the selected process steps such that data in a format that is compatible with a first software test tool is converted into a format that is compatible with a second software test tool; and
wherein the computer processor configuration to handle data conversion from a format that is compatible with a first software test tool to a format that is compatible with a second software test tool further comprises a configuration such that an output parameter for the first software test tool serves as input to the second software test tool, thereby creating a test flow between the first software test tool and the second software test tool.

16. The system of claim 15, wherein the test module is configured to store in a computer storage device a plurality of test scripts that are associated with the plurality of software test tools and to execute the plurality of software test tools using the plurality of test scripts; and wherein the test module is configured to process a result and a log of the selected process step such that results and logs of the plurality of software test tools are persisted in the system, thereby enabling a comparison among the results and logs of the plurality of software test tools.

17. The system of claim 15, wherein the test module comprises an abstraction layer that is separate and distinct from the manger module.

18. The system of claim 15, comprising a user interface, the user interface comprising the business process, the plurality of process steps, the plurality of test cases, the plurality of software test tools, the plurality of systems under test, and the plurality of parameters; wherein the user interface is configured to permit the selection of the particular process step, the selection of the particular test case for the particular process step, the selection of the particular software test tool for the particular test case, and the selection of the particular parameter flow for the particular software test tool.

19. The system of claim 15, wherein the process steps are distributed over a plurality of systems; and wherein the manager module is configured to determine a correct version of a test case to select as a function of a version of the system.

20. The system of claim 15, wherein the computer processor configuration that permits the user to select a particular process step of the business process, to select a particular test case for the particular process step, to select a particular software test tool for the particular test case, and to select a particular parameter flow for the particular software test tool, is further configured to display on a use interface at least one of a list of the selected test cases and a graphical display of the selected test cases including a process flow of the test cases.

21. A computer readable storage device comprising instructions that when executed by a processor execute a process comprising:
executing a manager module that oversees execution of a business process by a test module, the business process comprising a plurality of process steps, wherein the test module comprises a plurality of test cases, a plurality of software test tools, a plurality of systems under test, and a plurality of parameters;
selecting a particular process step of the business process, selecting a particular test case for the particular process step, selecting a particular software test tool for the particular test case, selecting a particular system under test, and selecting a particular parameter flow for the particular software test tool;
executing the selected process step using the selected let case, the selected software test tool, and the selected parameter flow; and
handling data conversion during execution of the selected process steps such that data in a format that is compatible with a first software test tool is convened into a format that is compatible with a second software test tool;
wherein the handling data conversion from a format that is compatible with a first software test tool to a format that is compatible with a second software test tool further comprises an output parameter for the first software test tool that serves as input to the second software test tool, thereby creating a test flow between the first software test tool and the second software test tool.

22. The computer readable storage device of claim 21, comprising instructions for:
storing in the computer readable storage device a plurality of test scripts that are associated with the plurality of software test tools, and executing the plurality of software test tools using the plurality of test scripts; and
processing a result and a log of the selected process step such that results and logs of the plurality of software test tools are persisted in the system, thereby enabling a comparison among the results and logs of the plurality of software test tools.

23. The computer readable storage device of claim 21, comprising instructions for displaying on a user interface at least one of a list of the selected test cases and a graphical display of the selected test cases including a process flow of the test cases.

* * * * *